United States Patent
Maduko et al.

(10) Patent No.: US 11,593,366 B2
(45) Date of Patent: Feb. 28, 2023

(54) TECHNIQUES FOR PUSHING JOINS INTO UNION ALL VIEWS

(71) Applicants: Angela Maduko, Dayton, OH (US); Nelly Korenevsky, Dayton, OH (US)

(72) Inventors: Angela Maduko, Dayton, OH (US); Nelly Korenevsky, Dayton, OH (US)

(73) Assignee: Teradata US, Inc., San Diego, CA (US)

( * ) Notice: Subject to any disclaimer, the term of this patent is extended or adjusted under 35 U.S.C. 154(b) by 973 days.

(21) Appl. No.: 15/852,488

(22) Filed: Dec. 22, 2017

(65) Prior Publication Data
US 2019/0197160 A1 Jun. 27, 2019

(51) Int. Cl.
G06F 16/2453 (2019.01)
G06F 16/242 (2019.01)
G06F 16/2455 (2019.01)

(52) U.S. Cl.
CPC ...... *G06F 16/24537* (2019.01); *G06F 16/244* (2019.01); *G06F 16/2456* (2019.01); *G06F 16/24532* (2019.01); *G06F 16/24544* (2019.01)

(58) Field of Classification Search
CPC .......... G06F 16/24532; G06F 16/244; G06F 16/2456; G06F 16/24537; G06F 16/24544
USPC .................................................... 707/714
See application file for complete search history.

(56) References Cited

U.S. PATENT DOCUMENTS

| | | | |
|---|---|---|---|
| 7,107,255 B2 | 9/2006 | Kiernan et al. | |
| 7,188,098 B2 | 3/2007 | Chen et al. | |
| 7,440,937 B2* | 10/2008 | Kiernan | G06F 16/24544 |
| 10,007,700 B2* | 6/2018 | Bondalapati | G06F 16/24542 |
| 2005/0065926 A1 | 3/2005 | Chen et al. | |
| 2006/0031204 A1* | 2/2006 | Liu | G06F 16/2471 |
| 2009/0313211 A1 | 12/2009 | Ghazal et al. | |
| 2011/0246448 A1* | 10/2011 | Tatemura | G06F 16/24526 707/714 |
| 2014/0095472 A1* | 4/2014 | Lee | G06F 16/24542 707/714 |
| 2015/0234888 A1* | 8/2015 | Ahmed | G06F 16/24535 707/765 |

* cited by examiner

*Primary Examiner* — Kuen S Lu
(74) *Attorney, Agent, or Firm* — Schwegman, Lundberg & Woessner, P.A.; Randy L. Campbell, Jr.

(57) ABSTRACT

A query with a UNION ALL (UA) view is detected by a query optimizer. A query execution plan and cost for the query is obtained. The query is rewritten to push aggregates of the original query into the view. A query execution plan is generated for the rewritten query and a cost for executing the rewritten query is obtained. The lowest cost execution plan is selected for execution by a database engine of a database.

20 Claims, 4 Drawing Sheets

TECHNIQUES FOR PUSHING JOINS INTO UNION ALL VIEWS

BACKGROUND

In order to perform intelligent analysis over large data while minimizing the processing time needed for the analysis, it is often imperative to partition this large data into smaller units. A UNION ALL view/derived table is one of several commonly used techniques for partitioning large data into smaller units. As an example, it would not be uncommon for a sales company to store data accumulated over a number of years in order to study and exploit the purchase pattern of its customers. Such data could grow exponentially, therefore, it is imperative that partitioning strategies are employed to better manage the data.

With the advent of multiple hash maps that will co-exist on a system, it becomes even more imperative to optimize UNION ALL queries on tables residing on different hash maps.

Typically, query processing of aggregate operations on a UNION ALL view/derived table was done by first spooling the UNION ALL view, before the aggregate operations were done. This was done irrespective of the type of operations contained within the UNION ALL view.

However, because commercial database have voluminous amounts of data that can be distributed over many network nodes, spooling too much or too frequently can cause significant performance bottlenecks I the database system.

Therefore, there is a need for improved processing techniques with UNION ALL views.

SUMMARY

Methods and a system for pushing join operations into UNION ALL (UA) views are presented.

In an embodiment, a method for pushing join operations into UA views is provided. A query is received and a query execution plan is generated for the query with a first cost of executing the query execution plan. The query is rewritten as a rewritten query by pushing aggregates of the query into a UNION ALL (UA) view. A second query execution plan is generated with a second cost of executing the second query execution plan. A selection is made to one of: the query execution plan and the second query execution plan based on a lower cost associated with the first cost and the second cost.

DETAILED DESCRIPTION

Various embodiments depicted herein are implemented as one or more software modules, which are programmed within memory and/or non-transitory computer-readable storage media and executed on one or more processing devices (having memory, storage, network connections, one or more processors, etc.).

As used herein, the terms and phrases "database," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse").

As used herein a "processing unit" is a distributed database engine that executes instructions on a network node device of the processing unit. Multiple distributed processing units are provided for executing database instructions in parallel over a network. The phrase "processing unit" may be used interchangeable and synonymously with the phrase "Access Module Processor (AMP)."

As used herein, a "resource" can be a hardware resource or a software resource, such as a software program, a data file, a data table, or various combinations of hardware and software resources.

As used herein a "view" is a searchable database object defined by user using a "Create View" command or defined as a derived table in a query. It may be viewed as a "virtual table" that can combine data from two or more tables, using joins or set operations, such as Union All, and can contain subsets of information needed for satisfying the query.

As used herein, a "UA view" can include a view or a derived table that uses a Union ALL operation.

A novel processing technique is provided for producing an equivalent rewrite of an aggregate query on a UA view by pushing the aggregates into the view, so as to obtain the cost of the original and rewritten queries, with the better of the two approaches retained for processing the query.

Figure 1:
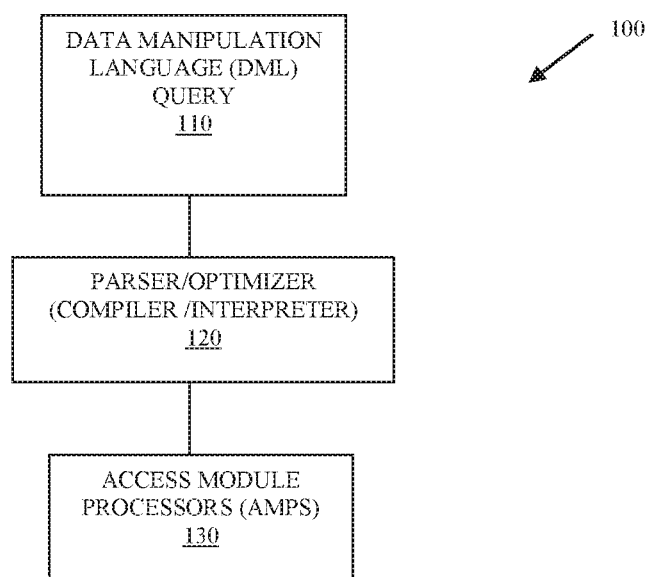
FIG. 1 is a diagram of a system for pushing join operations into UA views, according to an embodiment.

FIG. 1 is a diagram of a system 100 for a distributed data warehouse, according to an embodiment.

The system 100 is shown in greatly simplified form with just those components necessary for comprehension of embodiments of the invention presented. It is to be understood that additional components or subcomponents may be used without departing from the teachings presented herein.

The system 100 includes a Data Manipulation Language (DML) (such as Structured Query Language (SQL)) query 110 (herein after just "query 110," a parser/optimizer (compiler/interpreter) 120 (herein after just "optimizer 102"), and Access Module Processors (AMPS) 130—that execute instructions against the database—the processing units or database engines).

The query 110 can be issued and/or originate from an automated process (application or script) within the warehouse/database (such as through schedule reports, etc.) or can be issued and/or originate from an end-user (such as a Database Administrator (DBA) or Data Analyst) through a user-interface to the warehouse/database.

The optimizer 120 translates or interrupts the query 110 into a set of optimal instructions that the AMPs 130 process against the warehouse. Multiple query execution plans are typically produced by the optimizer 120 and the optimizer selects an optimal (least-cost) plan for execution.

The optimizer 120, then, provides the query instructions in accordance with the selected plan to the AMPs 130, each AMP 130 process instructions against tables that are assigned to that AMP 130.

The UA view optimization techniques are implemented as one or more executable instructions as enhancements to the optimizer 120.

The UA view optimization techniques proceed as follows:

Where possible, the branches of the UA view are grouped into two groups comprising single tables and multi-tables/spool groups. The original query is rewritten with the aggregates pushed into the UA view. The aggregates that were pushed into the UNION ALL view are hidden. The original query 110 is planned (with aggregates in the UA views hidden).

Before the original query 110 is committed, the following processing is performed by the optimize 120: The aggregates that were pushed into the UNION ALL view are revealed (unhidden). The cost of the rewritten query are incrementally costed out. If at any time, the cost of the re-written query exceeds the cost of the original query, stop processing and commit the original query for processing by the AMPs 130.

The initial cost includes the cost of the pushed aggregates on single tables and the cost of using any aggregate join indices that become eligible due to the pushed aggregates.

The next cost comprises the cost of the pushed aggregates on multi-tables or spools. These are grouped into those for which a local aggregate operation can or cannot be done. This grouping is based on primary key bindings on the multi-tables or spools.

The last cost is composed of the following. The cost of nested aggregate operations, i.e. the cost of the pushed aggregates on already existing aggregate operations in the UA view. The cost of aggregating over the pushed aggregates, i.e. the final aggregate operation. If the cost of the re-written query is less than that of the original query, the rewritten query is planned and executed.

A variety of examples of the novel technique for cost-based pushing of join operations into UA views is now presented along with: example implementations and sample text results to illustrate the improved processing of the optimizer.

Suppose that sales data for which the UA strategy is to be used to partition the data into more manageable units. The interest in this data is for the past two years of sales data. In this example, the data could be partitioned into three tables SALES_current, SALES_previous and SALES_old, to store the sales data within one year, in the past one year and in the past. This partitioning may be presented as follows in Structured Query Language (SQL—and one type of DML):

```
CREATE TABLE SALES_old
(
    S_ORDERKEY DECIMAL(18,0) NOT NULL,
    S_CUSTKEY DECIMAL(18,0) NOT NULL,
    S_STOREKEY INTEGER NOT NULL,
    S_TOTALPRICE DECIMAL(15,2) NOT NULL,
    S_DATE DATE NOT NULL,
    CONSTRAINT old_cc CHECK (S_DATE <
CURRENT_DATE - INTERVAL '2' YEAR)
)
PRIMARY INDEX (S_ORDERKEY);
CREATE TABLE SALES_previous
(
    S_ORDERKEY DECIMAL(18,0) NOT NULL,
    S_CUSTKEY DECIMAL(18,0) NOT NULL,
    S_STOREKEY INTEGER NOT NULL,
    S_TOTALPRICE DECIMAL(15,2) NOT NULL,
    S_DATE DATE NOT NULL,
    CONSTRAINT old_cc CHECK (S_DATE >=
CURRENT_DATE - INTERVAL '2' YEAR AND
                            S_DATE < CURRENT_DATE -
INTERVAL '1' YEAR)
)
PRIMARY INDEX (S_ORDERKEY);
CREATE TABLE SALES_current
```

```
(
    S_ORDERKEY DECIMAL(18,0) NOT NULL,
    S_CUSTKEY DECIMAL(18,0) NOT NULL,
    S_STOREKEY INTEGER NOT NULL,
    S_TOTALPRICE DECIMAL(15,2) NOT NULL,
    S_DATE DATE NOT NULL,
    CONSTRAINT old_cc CHECK (S_DATE >=
CURRENT_DATE - INTERVAL '1' YEAR)
)
PRIMARY INDEX (S_ORDERKEY);
```

Suppose also that the following statistics on S_STOREKEY column are the only available ones on the tables:

| Table | Number of Rows | Number of distinct values |
|---|---|---|
| Sales_current | 5,00,000 | 20 |
| Sales_previous | 1,000,000 | 20 |
| Sales_old | 1,000,000,000 | 20 |

First Example Query 110 and Corresponding Query Execution Plan

Assume the interest is in finding the total sales at all stores. The query 110 (on the tables—referred to as "original query" herein for the example) is as shown below:

```
FROM
(
    SELECT S_STOREKEY FROM SALES_current
    UNION ALL
    SELECT S_STOREKEY FROM SALES_previous
    UNION ALL
    SELECT S_STOREKEY FROM SALES_old
)dt(STOREKEY);
```

The above query 110 (referred to as "rewritten query" herein for the example) is rewritten as follows by the optimizer to include pushing aggregates into the derived table.

```
SELECT SUM(total_sales)
FROM
(
    SELECT COUNT(*)
    FROM SALES_current
    UNION ALL
    SELECT COUNT(*)
    FROM SALES_previous
    UNION ALL
    SELECT COUNT(*)
    FROM SALES_old
) dt(total_sales);
```

As can be observed in the rewritten query, there is no grouping associated with the aggregate operation, hence only one row is expected as the result of the rewritten query. The enhanced optimizer 120 pushes aggregates without grouping into the derived table, which reduces both the rewritten query processing time (as compared to the original query) and at the same time reduces the size of the spools (as compared to the original query) used during the query 110 processing.

The EXPLAIN statement for the original query produced by the optimizer 120 for the query execution plan for the original query is as follows.

1) First, lock TEST1.SALES_current for read on a reserved RowHash to prevent global deadlock.
2) Next, lock TEST1.SALES_previous for read on a reserved RowHash to prevent global deadlock.
3) Lock TEST1.SALES_old for read on a reserved RowHash to prevent global deadlock.
4) Lock TEST1.SALES_current for read, we lock TEST1.SALES_previous for read, and we lock TEST1.SALES_old for read.
5) Do an all-AMPs SUM step to aggregate from TEST1.SALES_current by way of a cylinder index scan with no residual conditions. Aggregate Intermediate Results are computed globally, then placed in Spool 7. The size of Spool 7 is estimated with high confidence to be 1 row (23 bytes). The estimated time for this step is 0.11 seconds.
6) Execute the following steps in parallel.
   1) Do an all-AMPs RETRIEVE step from Spool 7 (Last Use) by way of an all-rows scan into Spool 1 (all_amps), which is built locally on the AMPs 130. The size of Spool 1 is estimated with high confidence to be 1 row (29 bytes). The estimated time for this step is 0.03 seconds,
   2) Do an all-AMPs SUM step to aggregate from TEST1.SALES_previous by way of a cylinder index scan with no residual conditions. Aggregate Intermediate Results are computed globally, then placed in Spool 10. The size of Spool 10 is estimated with high confidence to be 1 row (23 bytes). The estimated time for this step is 0.15 seconds.
7) Execute the following steps in parallel.
   1) Do an all-AMPs RETRIEVE step from Spool 10 (Last Use) by way of an all-rows scan into Spool 1 (all_amps), which is built locally on the AMPs 130. The size of Spool 1 is estimated with high confidence to be 2 rows (58 bytes). The estimated time for this step is 0.03 seconds.
   2) Do an all-AMPs SUM step to aggregate from TEST1.SALES_old by way of a cylinder index scan with no residual conditions. Aggregate Intermediate Results are computed globally, then placed in Spool 13. The input table will not be cached in memory, but it is eligible for synchronized scanning. The size of Spool 13 is estimated with high confidence to be 1 row (23 bytes). The estimated time for this step is 1 minute and 2 seconds.
8) Do an all-AMPs RETRIEVE step from Spool 13 (Last Use) by way of an all-rows scan into Spool 1 (all_amps), which is built locally on the AMPs 130. The size of Spool 1 is estimated with high confidence to be 3 rows (87 bytes). The estimated time for this step is 0.03 seconds.
9) Do an all-AMPs SUM step to aggregate from Spool 1 (Last Use) by way of an all-rows scan, grouping by field1 (32718). Aggregate Intermediate Results are computed globally, then placed in Spool 16. The size of Spool 16 is estimated with high confidence to be 1 row (19 bytes). The estimated time for this step is 0.11 seconds.
10) Do an all-AMPs RETRIEVE step from Spool 16 (Last Use) by way of an all-rows scan into Spool 2 (group_amps), which is built locally on the AMPs. The size of Spool 2 is estimated with high confidence to be 1 row (32 bytes). The estimated time for this step is 0.03 seconds.
11) Finally, send out an END TRANSACTION step to all AMPs 130 involved in processing the request.

*The contents of Spool 2 are sent back to the user as the result of statement 1. The total estimated time is 1 minute and 3 seconds.

The explanation shown above is that of the original query, i.e., without pushing aggregates whereas that shown below is that of the re-written query with the aggregates pushed into the derived table. As can be seen from the explanations, it is estimated that the query would be processed in 1 hour and 16 minutes for the original query but in 1 minute and 3 seconds for the re-written query. The size of the common spool used for processing the view before the final aggregate operation is estimated at 1,001,500,000 rows, i.e. 22,033,000,000 bytes for the original query as opposed to 3 rows and 87 bytes for the re-written query. The final row count returned to the user is 1 row in both cases.

Second Example Query 110 and Corresponding Query Execution Plan

The interest in this example is in finding the total sales by each store. The query 110 (on the tables—referred to as "original query #2" herein for the example) and its re-written version with the aggregates pushed into the derived table are as shown below.

```
SELECT COUNT(*), STOREKEY
FROM
(
    SELECT S_STOREKEY FROM SALES_current
    UNION ALL
    SELECT S_STOREKEY FROM SALES_previous
    UNION ALL
    SELECT S_STOREKEY FROM SALES_old
) dt(STOREKEY)
GROUP BY STOREKEY;
```

The rewritten query 110 (rewritten query #2 for the example) by the optimizer appears as follows.

```
SELECT SUM(total_sales), STOREKEY
FROM
(
SELECT COUNT(*), STOREKEY
FROM SALES_current
GROUP BY S_STOREKEY
UNION ALL
SELECT COUNT(*), S_STOREKEY
FROM SALES_previous
GROUP BY S_STOREKEY
UNION ALL
SELECT COUNT(*), S_STOREKEY
FROM SALES_old
GROUP BY S_STOREKEY
) dt(total_sales, store)
GROUP BY STOREKEY;
```

As can be observed in the rewritten query #2, there is a grouping on STOREKEY associated with the aggregate operation. The number of rows expected depends on the uniqueness of STOREKEY. In this case, 20 rows are expected. Below it will be demonstrated how pushing aggregates with grouping into the derived table improves performance.

The original query #2's EXPLAIN statement for its query execution plan produced by the optimizer 120 is as follows:
1) First, lock TEST1.SALES_current for read on a reserved RowHash to prevent global deadlock.
2) Next, lock TEST1.SALES_previous for read on a reserved RowHash to prevent global deadlock.
3) Lock TEST1.SALES_old for read on a reserved RowHash to prevent global deadlock,
4) Lock TEST1.SALES_current for read, we lock TEST1.SALES_previous for read, and we lock TEST1.SALES_old for read.
5) Do an all-AMPs RETRIEVE step from TEST1.SALES_current by way of an all-rows scan with no residual conditions into Spool 1 (all_amps), which is built locally on the AMPs 130. The size of Spool 1 is estimated with high confidence to be 500,000 rows (12,500,000 bytes). The estimated time for this step is 2.50 seconds.
6) Do an all-AMPs RETRIEVE step from TEST1.SALES_previous by way of an all-rows scan with no residual conditions into Spool 1 (all_amps), which is built locally on the AMPs 130. The size of Spool 1 is estimated with high confidence to be 1,500,000 rows (37,500,000 bytes). The estimated time for this step is 4.94 seconds.
7) Do an all-AMPs RETRIEVE step from TEST1.SALES_old by way of an all-rows scan with no residual conditions into Spool 1 (all_amps), which is built locally on the AMPs 130. The input table will not be cached in memory, but it is eligible for synchronized scanning. The result spool file will not be cached in memory. The size of Spool 1 is estimated with high confidence to be 1,001,500,000 rows (25,037,500,000 bytes). The estimated time for this step is 1 hour and 22 minutes.
8) Do an all-AMPs SUM step to aggregate from Spool 1 (Last Use) by way of an all-rows scan, grouping by field1 (dt.STOREKEY). Aggregate Intermediate Results are computed globally, then placed in Spool 4. The size of Spool 4 is estimated with low confidence to be 60 rows (1,740 bytes). The estimated time for this step is 33 minutes and 27 seconds.
9) Do an all-AMPs RETRIEVE step from Spool 4 (Last Use) by way of an all-rows scan into Spool 2 (group_amps), which is built locally on the AMPs 130. The size of Spool 2 is estimated with low confidence to be 60 rows (2,580 bytes). The estimated time for this step is 0.08 seconds.
10) Finally, send out an END TRANSACTION step to all AMPs involved in processing the request.
→ The contents of Spool 2 are sent back to the user as the result of statement 1. The total estimated time is 1 hour and 55 minutes.

The processing of the optimizer shown in the above examples is of the original queries #1 and #2, i.e., without pushing aggregates whereas shown below is that of the rewritten queries #1 and #2 with the aggregates pushed into the derived table. As can be seen from the explanations, it is estimated that the query would be processed in 1 hour and 55 minutes for the original query but in 56 minutes and 1 second for the re-written query. Further, better estimates are returned for the result row count returned to the user in the re-written query i.e. 40 rows as opposed to 60 rows in the case of the original query.
1) First, lock TEST1.SALES_current for read on a reserved RowHash to prevent global deadlock.
2) Next, lock TEST1.SALES_previous for read on a reserved RowHash to prevent global deadlock.
3) LockTEST1.SALES_old for read on a reserved RowHash to prevent global deadlock.
4) Lock TEST1.SALES_current for read, we lock TEST1.SALES_previous for read, and we lock TEST1.SALES_old for read.
5) Do an all-AMPs SUM step to aggregate from TEST1.SALES_current by way of an all-rows scan with no residual conditions, grouping by field1 (TEST1.SALES_current.S_STOREKEY). Aggregate Intermediate Results are computed globally, then placed in Spool 10. The size of Spool 10 is estimated with high confidence to be 20 rows (580 bytes). The estimated time for this step is 1.77 seconds.
6) Execute the following steps in parallel.
   1) Do an all-AMPs RETRIEVE step from Spool 10 (Last Use) by way of an all-rows scan into Spool 1 (all_amps), which is built locally on the AMPs 130. The size of Spool 1 is estimated with high confidence to be 20 rows (660 bytes). The estimated time for this step is 0.08 seconds.
   2) Do an all-AMPs SUM step to aggregate from TEST1.SALES_previous by way of an all-rows scan with no residual conditions, grouping by field1 (TEST1.SALES_previous.S_STOREKEY). Aggregate Intermediate Results are computed globally, then placed in Spool 13. The size of Spool 13 is estimated with high confidence to be 20 rows (580 bytes). The estimated time for this step is 3.44 seconds.
7) Execute the following steps in parallel.
   1) We do an all-AMPs RETRIEVE step from Spool 13 (Last Use) by way of an all-rows scan into Spool 1 (all_amps), which is built locally on the AMPs 130. The size of Spool 1 is estimated with high confidence to be 40 rows (1,320 bytes). The estimated time for this step is 0.08 seconds.
   2) Do an all-AMPs SUM step to aggregate from TEST1.SALES_old by way of an all-rows scan with no residual conditions, grouping by field1 (TEST1.SALES_old.S_STOREKEY). Aggregate Intermediate Results are computed globally, then placed in Spool 16. The input table will not be cached in memory, but it is eligible for synchronized scanning. The size of Spool 16 is estimated with high confidence to be 20 rows (580 bytes). The estimated time for this step is 55 minutes and 55 seconds.
8) Do an all-AMPs RETRIEVE step from Spool 16 (Last Use) by way of an all-rows scan into Spool 1 (all_amps), which is built locally on the AMPs 130. The size of Spool 1 is estimated with high confidence to be 60 rows (1,980 bytes). The estimated time for this step is 0.08 seconds.
9) Do an all-AMPs SUM step to aggregate from Spool 1 (Last Use) by way of an all-rows scan, grouping by field1 (TEST1.SALES_current.S_STOREKEY). Aggregate Intermediate Results are computed globally, then placed in Spool 19. The size of Spool 19 is estimated with low confidence to be 40 rows (1,000 bytes). The estimated time for this step is 0.11 seconds.
10) Do an all-AMPs RETRIEVE step from Spool 19 (Last Use) by way of an all-rows scan into Spool 2 (group_amps), which is built locally on the AMPs 130. The size of Spool 2 is estimated with low confidence to be 40 rows (1,720 bytes). The estimated time for this step is 0.08 seconds.

11) Finally, send out an END TRANSACTION step to all AMPs involved in processing the request.
→ The contents of Spool 2 are sent back to the user as the result of statement 1. The total estimated time is 56 minutes and 1 second.

Using Join Indices

This example re-uses the query #2 but introduces an aggregate join index on the table SALES_old. This is to show how the use of aggregate join indices (which are possible only when the aggregates are pushed into the view, i.e., supposing that the branches of the UA views did not originally contain an aggregate operation) further improves performance.

Suppose there is an aggregate join index defined on the SALES_old table with statistics on S_STOREKEY column as follows:

```
CREATE JOIN INDEX SALES_old_aji AS
SELECT S_STOREKEY s_key, COUNT(*) count_star
FROM SALES_old
GROUP BY S_STOREKEY;
```

| Table | Number of Rows | Number of distinct values |
|---|---|---|
| Sales_old_aji | 20 | 20 |

The optimizer 120 uses join indices to on query #2 to produce a query execution plan with the EXPLAIN as follows:

1) First, lock test1.SALES_OLD_AJI for read on a reserved RowHash to prevent global deadlock.
2) Next, lock TEST1.SALES_current for read on a reserved RowHash to prevent global deadlock.
3) LockTEST1.SALES_previous for read on a reserved RowHash to prevent global deadlock.
4) Lock test1.SALES_OLD_AJI for read, we lock TEST1.SALES_current for read, and we lock TEST1.SALES_previous for read.
5) Do an all-AMPs SUM step to aggregate from TEST1.SALES_current by way of an all-rows scan with no residual conditions, grouping by field1 (TEST1.SALES_current.S_STOREKEY). Aggregate Intermediate Results are computed globally, then placed in Spool 10. The size of Spool 10 is estimated with high confidence to be 20 rows (580 bytes). The estimated time for this step is 1.77 seconds,
6) Execute the following steps in parallel.
   1) We do an all-AMPs RETRIEVE step from Spool 10 (Last Use) by way of an all-rows scan into Spool 1 (all_amps), which is built locally on the AMPs 130. The size of Spool 1 is estimated with high confidence to be 20 rows (660 bytes). The estimated time for this step is 0.08 seconds.
   2) Do an all-AMPs SUM step to aggregate from TEST1.SALES_previous by way of an all-rows scan with no residual conditions, grouping by field1 (TEST1.SALES_previous.S_STOREKEY). Aggregate Intermediate Results are computed globally, then placed in Spool 13. The size of Spool 13 is estimated with high confidence to be 20 rows (580 bytes). The estimated time for this step is 3.44 seconds.
   7) Do an all-AMPs RETRIEVE step from Spool 13 (Last Use) by way of an all-rows scan into Spool 1 (all_amps), which is built locally on the AMPs 130. The size of Spool 1 is estimated with high confidence to be 40 rows (1,320 bytes). The estimated time for this step is 0.08 seconds.
   8) Do an all-AMPs RETRIEVE step from test1.SALES_OLD_AJI by way of an all-rows scan with no residual conditions into Spool 1 (all_amps), which is built locally on the AMPs 130. The size of Spool 1 is estimated with high confidence to be 60 rows (1,980 bytes). The estimated time for this step is 0.07 seconds.
9) Do an all-AMPs SUM step to aggregate from Spool 1 (Last Use) by way of an all-rows scan, grouping by field1 (TEST1.SALES_current.S_STOREKEY). Aggregate Intermediate Results are computed globally, then placed in Spool 16. The size of Spool 16 is estimated with low confidence to be 40 rows (1,000 bytes). The estimated time for this step is 0.11 seconds.
10) Do an all-AMPs RETRIEVE step from Spool 16 (Last Use) by way of an all-rows scan into Spool 2 (group_amps), which is built locally on the AMPs 130. The size of Spool 2 is estimated with low confidence to be 40 rows (1,720 bytes). The estimated time for this step is 0.08 seconds.
11) Finally, send out an END TRANSACTION step to all AMPs involved in processing the request.
The contents of Spool 2 are sent back to the user as the result of statement 1. The total estimated time is 5.56 seconds.

The EXPLAIN shown above is that of the re-written query #2 with the aggregates pushed into the view. As can be seen from the explanations, the aggregate join index on table SALES_old is used. With this, it is estimated that the original query #2 would be processed in mere 5.56 seconds as opposed to 1 hour and 55 minutes for the original query #2 and 56 minutes and 1 second for the re-written query #2 without the aggregate join index.

The advantages of pushing aggregates into UNION ALL views through query re-writing (through the enhanced processing of the optimizer 120) include:

1. Generalized form of aggregation pushing.
2. Allows for performance improvements.
3. Qualifications of aggregate join indices where possible will help to further improve performance.
4. Allows for the reduction in size of spools used, since the size of spools used is proportional to the uniqueness of the GROUP BY columns.
5. Grouping the branches of the UA views into single tables and multi-tables/spool groups where possible alleviates the potential increase in parsing time, in that the desired group could be directly accessed.
6. The in-place infrastructure that allows for early termination of the planning of the pushed aggregates in the UA views allows for sensitivity to the potential increase in parsing time.
7. The aggregate operations on single table blocks will be done directly on the tables, without spooling.
8. Grouping of multi-tables/spools based on the possibility of doing a local aggregate operation on them, helps to further improve performance.
9. In addition, this grouping of multi-tables/spools reduces the number of aggregate operations that would be done, leading to even further performance improvement, since aggregate operations are expensive.

10. Pushing aggregates to every join block will facilitate pipe-lining of join and aggregate operations, in the event that pipe-lining these operations becomes available.

11. With the push of aggregate operations to UA views, DISTINCT to GROUP BY optimizations that does duplicate eliminations through a SORT or a SUM step is enabled within the view.

12. Allows for more flexibility in the physical database design.

These and other embodiments are now discussed with reference to the FIGS. 2-4.

Figure 2:
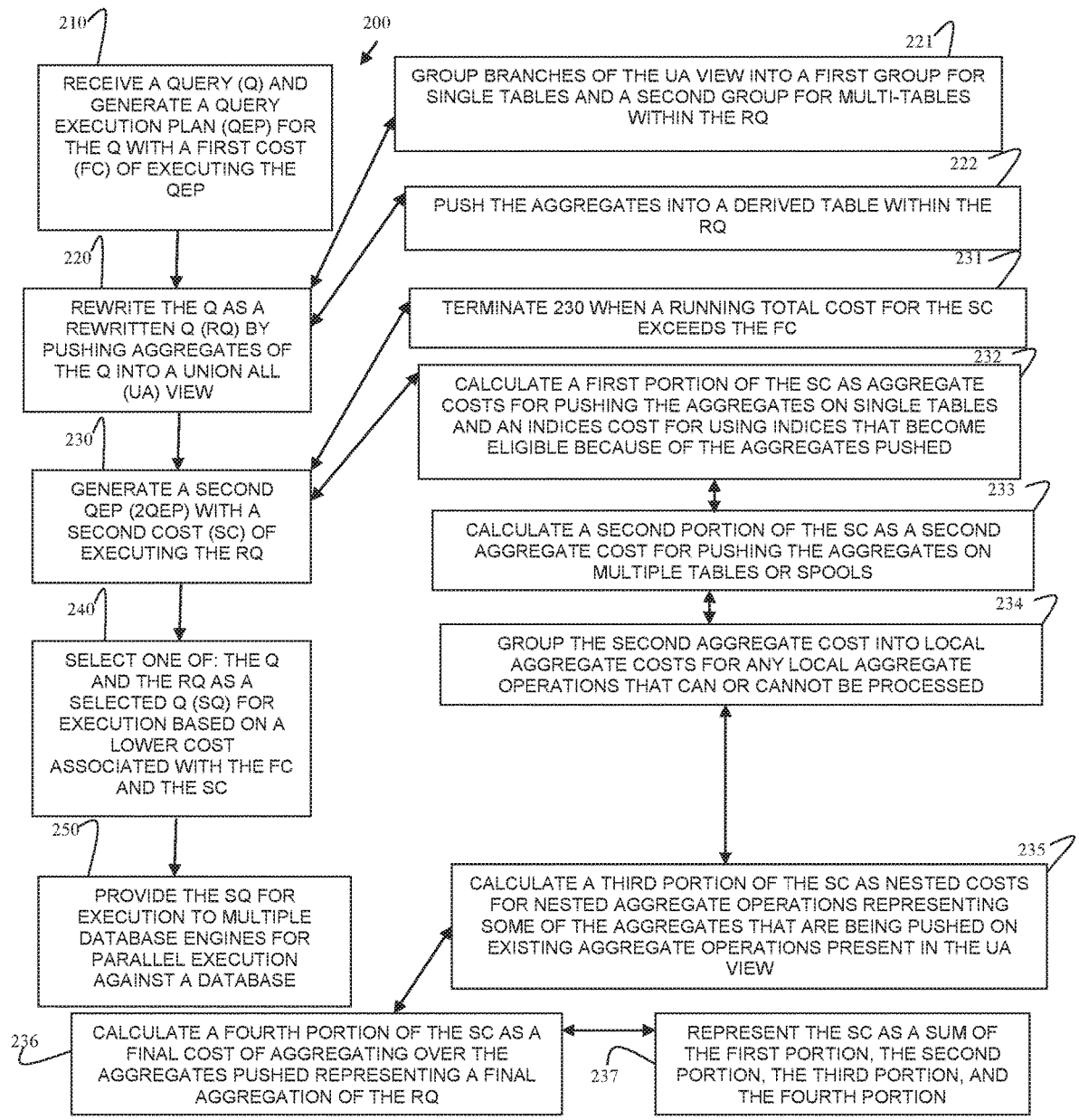
FIG. 2 is a diagram of a method for pushing join operations into UA views, according to an example embodiment.

FIG. 2 is a diagram of a method 200 for pushing join operations into UA views, according to an example embodiment. The method 200 is implemented as one or more software modules referred to as a "UA query rewriter"). The UA query rewriter is executable instructions that are programmed within memory or a non-transitory computer-readable medium and executed by one or more hardware processors. The UA query rewriter has access to one or more network connections during processing, which can be wired, wireless, or a combination of wired and wireless.

In an embodiment, the UA query rewriter is implemented within a data warehouse across one or more physical devices or nodes (computing devices) for execution over a network connection.

In an embodiment, the UA query rewriter is the optimizer 120 with the enhanced processing discussed above with the FIG. 1.

At 210, the UA query rewriter receives a query for processing and generates a query execution plan for the query with first costs (based on database statistics returned for the resources and conditions defined in the user-provided query).

At 220, the UA query rewriter rewrites the query as a re-written and equivalent query by pushing aggregates of the original query into a UA view.

In an embodiment of 220 and at 221, the UA query rewriter groups the branches of the UA view into a first group for single tables and a second group for multi-tables within the rewritten query.

In an embodiment, at 222, the UA query rewriter pushes the aggregates into a derived table within the rewritten query.

At 230, the UA query rewriter generates a second query execution plan with a second cost of executing the rewritten query.

In an embodiment, at 231, the UA query rewriter terminates the processing at 230 when a running total cost for the second cost exceeds the first cost associated with the original query and the first query execution plan. That is, the rewritten query's execution plan (second query execution plan) is iteratively developed for the pushed aggregates and as soon as the second query execution plan exceeds the first cost for the original query processing is stopped and the original query at 240 is selected as a selected query for execution.

In an embodiment, at 232, the UA query rewriter calculates a first portion of the second cost as aggregate costs for pushing the aggregates on single tables and an indices cost for using indices that become eligible because of the aggregates pushed.

In an embodiment of 232 and at 233, the UA query rewriter calculates a second portion of the second cost as second aggregate costs for pushing the aggregates on multiple tables or spools.

In an embodiment of 233 and at 234, the UA query rewriter groups the second aggregate cost into local aggregate costs for any local aggregate operations that can or cannot be processed with the re-written query.

In an embodiment of 234 and at 235, the UA query rewriter calculates a third portion of the second cost as nested costs for a nested aggregate operations representing some of the aggregates that are being pushed on existing aggregate operations present in the UA view.

In an embodiment of 235 and at 236, the UA query rewriter calculates a fourth portion of the second cost as a final cost of aggregating over the aggregates pushed representing a final aggregation processed in the rewritten query.

In an embodiment of 236 and at 237, the UA query rewriter represents the second cost as a sum of: the first portion, the second portion, the third portion, and the fourth portion.

At 240, the UA query rewriter provides selects one of: the query and the rewritten query as a selected query for execution based on a lower cost associated with the first cost and the second cost.

In an embodiment, at 250, the UA query rewriter provides the selected query for execution along with the first query execution plan to multiple database engines (AMPS 130) for parallel execution against a database.

Figure 3:
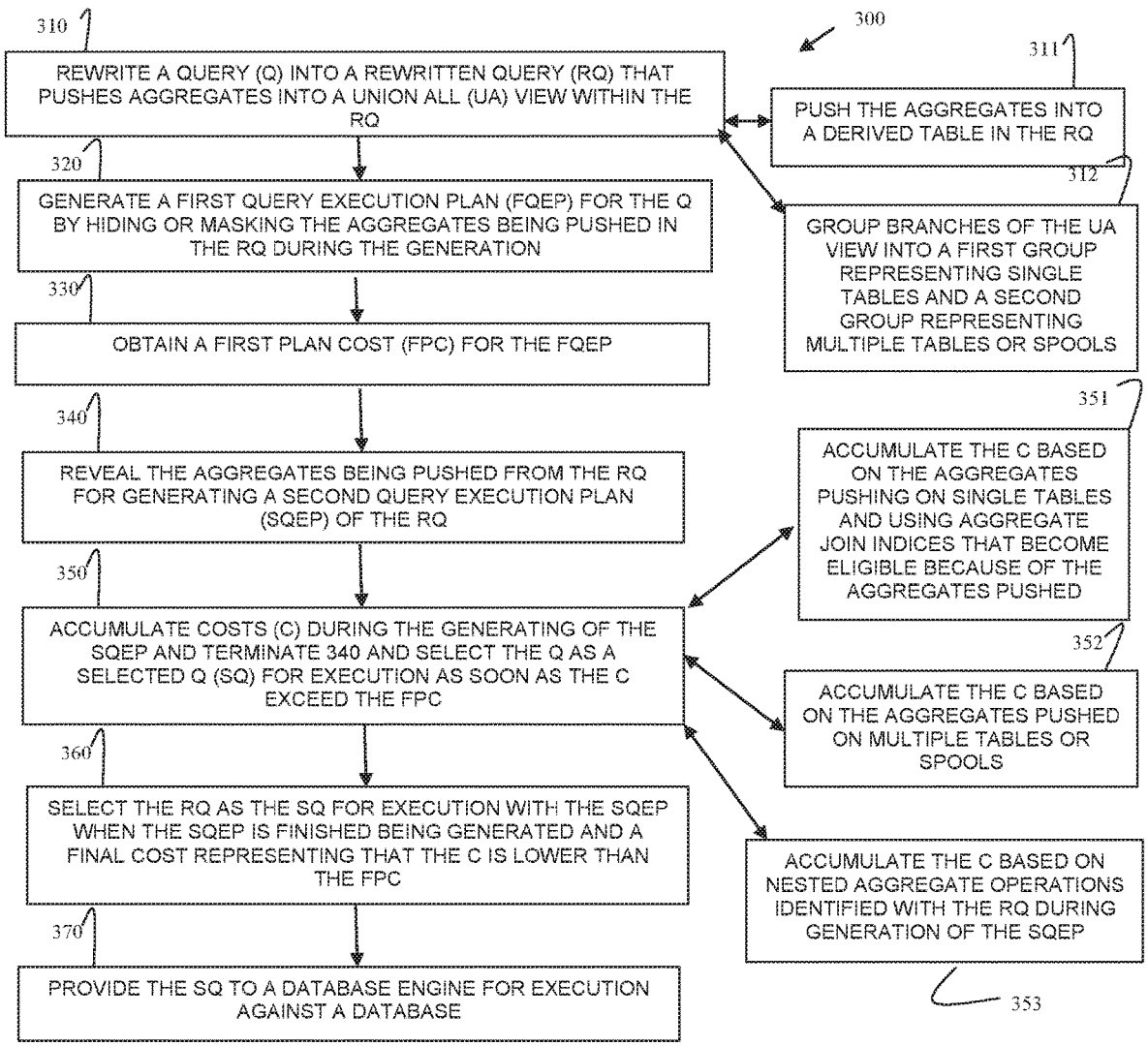
FIG. 3 is a diagram of another method for pushing join operations into UA views, according to an example embodiment.

FIG. 3 is a diagram of another method 300 for pushing join operations into UA views, according to an example embodiment. The method 300 is implemented as one or more software modules referred to as a "query join manager." The query join manager is executable instructions that are programmed within memory or a non-transitory computer-readable medium and executed by one or more hardware processors. The query join manager has access to one or more network connections during processing, which can be wired, wireless, or a combination of wired and wireless.

The query join manager presents another and in some ways enhanced perspective of the processing discussed above with the FIG. 1.

In an embodiment, the query join manager is all or some combination of: the optimizer 120 and/or the method 200.

At 310, the query join manager rewrites a query provided by a user for execution into a rewritten query that pushes aggregates into a UA view within the rewritten query.

According to an embodiment, at 311, the query join manager pushes the aggregates into a derived table in the rewritten query.

In an embodiment, at 312, the query join manager groups branches of the UA view into a first group representing single tables and a second group representing multiple tables or spools.

At 320, the query join manager generates a first query execution plan for the query by hiding or masking the aggregates being pushed in the rewritten query during generation of the first query execution plan.

At 330, the query join manager obtains a first plan cost for the first query execution plan.

At 340, the query join manager reveals the aggregates being pushed from the rewritten query for generating a second query execution plan for the rewritten query.

At 350, the query join manager accumulates costs during the generating (at 340) and terminates (340) as soon as the costs exceed the first plan cost for the first query execution plan.

In an embodiment, at 351, the query join manager accumulate the costs based on the aggregates pushing on single tables and usage of aggregate join indices that become eligible because of the aggregates pushed.

In an embodiment, at 352, the query join manager accumulates the costs based on the aggregates pushed on multiple tables or spools.

In an embodiment, at 353, the query join manager accumulate the costs based on nested aggregate operations identified with the re-written query during generations of the second query execution plan.

At 360, the query join manager selects the rewritten query as the selected query when the second query execution plan is finished being generated and a final cost representing the costs is lower than the first plan cost.

According to an embodiment, at 370, the query join manager provides the selected query to a database engine for execution against a database.

Figure 4:
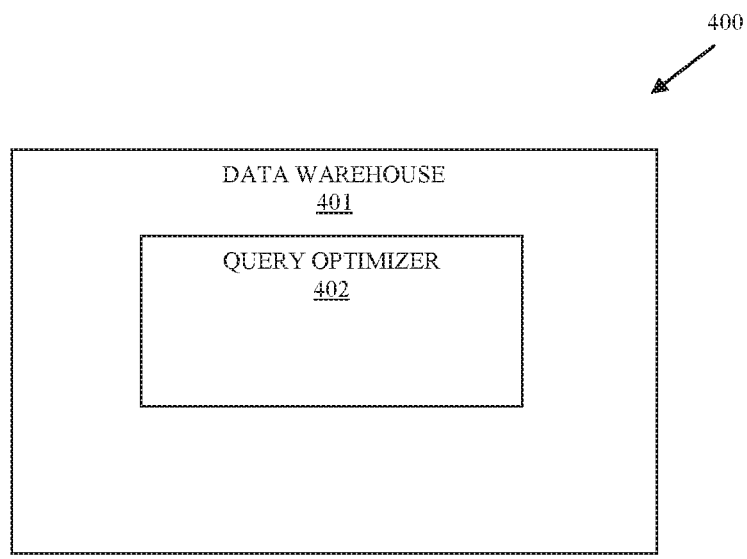
FIG. 4 is a diagram of a system for pushing join operations into UA views, according to an example embodiment.

FIG. 4 is a diagram of another system 400 for pushing join operations into UA views within a distributed data warehouse, according to an embodiment. The system 400 includes a variety of hardware components and software components. The software components are programmed as executable instructions into memory or a non-transitory computer-readable medium for execution on the hardware components.

The system 400 implements, inter alia, the processing discussed above with the FIGS. 1-3.

The system 400 includes a data warehouse 401. The data warehouse 401 includes a query optimizer 402.

The query optimizer 402 is configured to: 1) execute on at least one hardware processor of a network computing device, 2) rewrite an original query into a rewritten query that pushes aggregates of the original query into a UNION ALL view, 3) calculate a first cost to execute the original query, 4) calculate a second cost to execute the rewritten query, 5) select a selected query for execution within the data warehouse 401 as a lower cost of: the first cost and the second cost.

In an embodiment, the query optimizer 402 is further configured, in 3), to: iteratively calculate the second cost while a query execution plan for the rewritten query is being generated, and the query optimizer 402 terminates generation of the query execution plan and identifies the selected query as the original query when the second cost exceeds the first cost.

In an embodiment, the query optimizer 402 is implemented within the optimizer 120.

In an embodiment, the query optimizer 402 is the method 200.

In an embodiment, the query optimizer 402 is the method 300.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   receiving a query and generating a query execution plan for the query with a first cost of executing the query execution plan;
   rewriting the query as a rewritten query by pushing aggregates of the query into a UNION ALL (UA) view;
   generating a second query execution plan with a second cost of executing the rewritten query; and
   selecting one of: the query and the rewritten query as a selected query for execution based on a lower cost associated with the first cost and the second cost.

2. The method of claim 1, wherein rewriting further includes grouping branches of the UA view into a first group for single tables and a second group for multi-tables within the rewritten query.

3. The method of claim 1, wherein rewriting further includes pushing the aggregates into a derived table within the rewritten query.

4. The method of claim 1, wherein generating further includes terminating the generating when a running total cost for the second cost exceeds the first cost.

5. The method of claim 1, wherein generating further includes calculating a first portion of the second cost as aggregate costs for pushing the aggregates on single tables and an indices cost for using indices that become eligible because of the aggregates pushed.

6. The method of claim 5, wherein calculating further includes calculating a second portion of the second cost as second aggregate costs for pushing the aggregates on multiple tables or spools.

7. The method of claim 6, wherein calculating further include grouping the second aggregate cost into local aggregate costs for any local aggregate operations that can or cannot be processed.

8. The method of claim 7, wherein grouping further includes calculating a third portion of the second cost as nested costs of nested aggregate operations representing some of the aggregates that are being pushed on existing aggregate operations present in the UA view.

9. The method of claim 8, wherein calculating further includes calculating a fourth portion of the second cost as a final cost of aggregating over the aggregates pushed representing a final aggregation of the rewritten query.

10. The method of claim 9, wherein calculating further includes representing the second cost as a sum of the first portion, the second portion, the third portion, and the fourth portion.

11. The method of claim 1 further comprising, providing the selected query for execution to multiple database engines for parallel execution against a database.

12. A method, comprising:
   rewriting a query into a rewritten query that pushes aggregates into a UNION ALL (UA) view within the rewritten query;
   generating a first query execution plan for the query by hiding or masking the aggregates being pushed in the rewritten query during the generation;
   obtaining a first plan cost for the first query execution plan;
   revealing the aggregates being pushed from the rewritten query for generating a second query execution plan of the rewritten query;
   accumulating costs during the generating of the second query execution plan and terminating the generating and selecting the query as a selected query for execution as soon as the costs exceed the first plan cost; and
   selecting the rewritten query as the selected query for execution with the second query execution plan when the second query execution plan is finished being generated and a final cost representing that the accumulating costs is lower than the first plan cost.

13. The method of claim 12, wherein rewriting further includes pushing the aggregates into a derived table in the rewritten query.

14. The method of claim 12, wherein rewriting further includes grouping branches of the UA view into a first group representing single tables and a second group representing multiple tables or spools.

15. The method of claim 12, wherein accumulating further includes accumulating the costs based on the aggregates pushing on single tables and using aggregate join indices that become eligible because of the aggregates pushed.

16. The method of claim 12, wherein accumulating further includes accumulating the costs based on the aggregates pushed on multiple tables or spools.

17. The method of claim 12, wherein accumulating further includes accumulating the costs based on nested aggregate operations identified with the rewritten query during generation of the second query execution plan.

18. The method of claim 12 further comprising, providing the selected query to a database engine for execution against a database.

19. A system, comprising:
   a data warehouse including:
      a plurality of database network nodes;
      a query optimizer;
      wherein the query optimizer is configured to: i) execute on at least one network node of the data warehouse, ii) rewrite an original query into a rewritten query that pushes aggregates of the original query into a UNION ALL view, iii) calculate a first cost to execute the original query, iv) calculate a second cost to execute the rewritten query, and v) select a selected query for execution within the data warehouse as a lower cost of: the first cost and the second cost, and
   a processing unit for executing said selected query in parallel across said database network nodes.

20. The system of claim 19, wherein the query optimizer is further configured to iteratively calculate the second cost while a query execution plan for the rewritten query is being generated, and the query optimizer terminates generation of the query execution plan and identifies the selected query as the original query when the second cost exceeds the first cost.

* * * * *